UNITED STATES PATENT OFFICE.

JOHN FREDRICK MAY, OF NEWTON, KANSAS.

ABSORBING COMPOSITION AND PROCESS OF MAKING SAME.

No. 892,754.

Specification of Letters Patent.

Patented July 7, 1908.

Application filed March 5, 1908. Serial No. 419,258.

*To all whom it may concern:*

Be it known that I, JOHN FREDRICK MAY, a citizen of the United States, residing at Newton, in the county of Harvey and State of Kansas, have invented certain new and useful Improvements in Absorbing Composition and Process of Making Same; and I do declare the following to be a full, clear, and exact description of the invention, such as will enable others skilled in the art to which it appertains to make and use the same.

My invention relates to an improved process and composition for laying, collecting or absorbing dust in rooms, stores or similar places when the floors, carpets or other floor coverings, are being swept, and my object is to provide a composition that can be prepared and ready for use in a comparatively limited time, that will thoroughly collect or absorb the dust while a room is being swept, thus preventing the discomfort and unhealthfulness of the particles rising and filling the air in the room and obviating the inconvenience of removing it from the furniture upon which a part settles, that will thoroughly cleanse the floor, will not stain it, and that will serve as a disinfectant, deodorizer and moth destroyer, thereby serving a healthful purpose and often aiding in preventing the destruction of carpets.

To accomplish these objects I employ the following ingredients combined in about the proportion stated, viz: twenty pounds of saw-dust, thirty pounds of salt and forty pounds of sand. These must be thoroughly dry and each should be separately sifted through a sand sieve, in no case coarser than a No. 10. The salt is then put into a suitable vessel, the saw-dust added and the two are thoroughly mixed. To these I add the sand, thoroughly mixing it with the saw-dust and salt. I then add one pound of naphthalene and thoroughly mix it and the three previously mentioned ingredients. Having allowed about five quarts of non-volatile oil having a boiling point above 180° Fahrenheit to be heated until lukewarm and also, heated separately, about one and one half pints of paraffin, I pour the paraffin into the oil and quickly and thoroughly mix the paraffin and oil; while the paraffin is still warm I pour them into the vessel containing the ingredients previously mixed, as hereinbefore stated, and mix the saw-dust, salt, sand, naphthalene, oil and paraffin thoroughly together for about thirty minutes. The oil is then thoroughly absorbed and the mixture consists of uniform granules ready for use, the paraffin forming a coating over the granules which prevents the oil staining the floor. In my compound the oil I use is what is known as dustless floor oil. The base of this floor oil being a mineral oil which stands a fire test of about 325 degrees and the balance of the oil compound having an even higher fire test than the base, it will be seen that my composition through lack of inflammableness is unusually safe.

What I claim and desire to secure by Letters Patent, is:—

1. The herein-described composition of matter consisting of about 20 pounds of saw-dust, 30 pounds of salt, 40 pounds of sand and one pound of naphthalene in their dry state, with about one and one-half pints of paraffin and 5 quarts of dustless floor oil, substantially as set forth.

2. The process of producing a dust collecting or absorbing composition which consists in thoroughly drying and sifting saw-dust and sand, adding salt and naphthalene thereto, and mixing all thoroughly together, adding to said dry mixed composition a non-volatile oil having a boiling point above 180° Fahrenheit and paraffin heated and mixed, then thoroughly commingling said oil and paraffin with the dry material, the whole forming granules, substantially as described.

3. The herein-described composition of matter consisting of saw-dust, sand and salt, naphthalene, non-volatile oil above a boiling point of 180° Fahrenheit and paraffin, substantially as described.

In testimony whereof, I affix my signature in presence of two witnesses.

JOHN FREDRICK MAY.

Witnesses:
FRANK GREENE,
J. L. WILLIAMSON.